(12) United States Patent
Stathacopoulos

(10) Patent No.: US 11,606,600 B2
(45) Date of Patent: *Mar. 14, 2023

(54) SYSTEMS AND METHODS FOR RECORDING MEDIA ASSETS

(71) Applicant: Rovi Product Corporation, San Jose, CA (US)

(72) Inventor: Paul Stathacopoulos, San Carlos, CA (US)

(73) Assignee: Rovi Product Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/069,023

(22) Filed: Oct. 13, 2020

(65) Prior Publication Data
US 2021/0044859 A1 Feb. 11, 2021

Related U.S. Application Data

(63) Continuation of application No. 16/512,190, filed on Jul. 15, 2019, now Pat. No. 10,841,644, which is a
(Continued)

(51) Int. Cl.
*H04N 21/433* (2011.01)
*H04N 21/4147* (2011.01)
(Continued)

(52) U.S. Cl.
CPC ..... *H04N 21/4334* (2013.01); *G06F 16/7837* (2019.01); *G06F 16/7844* (2019.01); *G06F 40/205* (2020.01); *G11B 27/031* (2013.01); *G11B 27/105* (2013.01); *H04N 21/4147* (2013.01); *H04N 21/4394* (2013.01); *H04N 21/44008* (2013.01); *H04N 21/454* (2013.01); *H04N 21/45457* (2013.01); *H04N 21/472* (2013.01); *H04N 21/4755* (2013.01); *H04N 21/47214* (2013.01); *H04N 21/8133* (2013.01); *H04N 21/8456* (2013.01)

(58) Field of Classification Search
CPC .................................. H04N 21/4334
USPC ....................................... 386/296
See application file for complete search history.

(56) References Cited

U.S. PATENT DOCUMENTS 10,841,644 B2 * 11/2020 Stathacopoulos .. H04N 21/4394
2007/0212023 A1 * 9/2007 Whillock ............. H04N 21/466
386/281

(Continued)

*Primary Examiner* — Daniel T Tekle
(74) *Attorney, Agent, or Firm* — Lerner, David, Littenberg, Krumholz & Mentlik, LLP

(57) ABSTRACT

Systems and methods are provided to record portions of media assets. User request is received to record a media asset together with a criterion for recording portions of that media asset. A content recognition algorithm is executed against segments of the media asset to determine a set of keywords associated with those segments. Separately a set of keywords associated with the criterion is generated. Sets of keywords are compared and segments that match the criterion are discovered. If it is determined that a first segment and third segment each match the criterion and a second segment does not, a delete indicator is added to the second segment and the third and first segments are compared. If those segments match the delete indicator is removed from the second segment.

16 Claims, 7 Drawing Sheets

Related U.S. Application Data continuation of application No. 15/078,436, filed on Mar. 23, 2016, now Pat. No. 10,362,355.

(51) Int. Cl.
| | |
|---|---|
| *H04N 21/44* | (2011.01) |
| *H04N 21/439* | (2011.01) |
| *H04N 21/4545* | (2011.01) |
| *H04N 21/472* | (2011.01) |
| *H04N 21/475* | (2011.01) |
| *H04N 21/81* | (2011.01) |
| *H04N 21/845* | (2011.01) |
| *G06F 16/783* | (2019.01) |
| *G11B 27/031* | (2006.01) |
| *G06F 40/205* | (2020.01) |
| *H04N 21/454* | (2011.01) |
| *G11B 27/10* | (2006.01) |

(56) References Cited

U.S. PATENT DOCUMENTS

2009/0028520 A1* 1/2009 Jain .................. H04N 21/44008
386/323
2015/0262616 A1* 9/2015 Jaime ................... G11B 27/034
386/228

* cited by examiner

SYSTEMS AND METHODS FOR RECORDING MEDIA ASSETS

CROSS-REFERENCE TO RELATED APPLICATIONS

This application is a continuation of U.S. patent application Ser. No. 16/512,190, filed Jul. 15, 2019, which is a continuation of U.S. patent application Ser. No. 15/078,436, filed Mar. 23, 2016, now U.S. Pat. No. 10,362,355. The disclosures of which are hereby incorporated by reference herein in their entirety.

BACKGROUND

The amount of media content available to users today is enormous. When users are not able to consume media assets, at the time those media assets are broadcast, users schedule those media assets for recording. However, users sometimes desire to only consume specific portions of media assets; thus, those users may want the ability to record only the desired portions. Furthermore, optimizing storage of recorded media can be important from both capacity and cost perspectives.

SUMMARY

Therefore, systems and methods are provided herein to record portions of media assets. Recording portions of media assets enables the system to both present parts of media assets that users desire to consume and also to ensure that those media assets occupy an optimal amount of storage space. Specifically, a media guidance application may be configured to receive user input of a media asset to record, together with a criterion for recording portions of that media asset. The media guidance application may, upon receiving input from the user, schedule the media asset for recording, or, if the media asset is already in progress, start recording the media asset. When the media guidance application starts recording the media asset, the media guidance application may create segments corresponding to portions of the media asset. The media guidance application may execute a content recognition algorithm against each segment in order to determine a set of keywords associated with those segments. The media guidance application may also determine a set of keywords associated with the criterion. The media guidance application may compare the keywords associated with each segment with the keywords associated with the criterion until a first segment is found that matches the criterion.

When the media guidance application matches a segment to the criterion, the media guidance application may determine whether the next segment matches the criterion via the same keyword comparison described above. If the next segment does not match the criterion, the media guidance application may store a delete indicator with that segment (e.g., in the metadata associated with that segment or in the segment map). The media guidance application may compare the next segment with the criterion and, upon determining that this segment matches the criterion, determine whether the first segment matches the third segment. If the media guidance application determines that the first segment matches the third segment, then the media guidance application may remove the delete indicator from the second segment in order to retain continuity within the media asset of the segments related to one portion.

For example, the media guidance application may receive input from a user to record a specific broadcast of the Winter Olympics with a criterion of "ice hockey." A single broadcast of the Winter Olympics may include multiple sports and multiple hockey games. Thus, when the media guidance application starts recording the specific broadcast, the media guidance application may add a delete indicator to all the segments until a first instance of an ice hockey game starts. As the media guidance application continues to record the ice hockey game, segments that are not related to ice hockey (e.g., news breaks, coverage of a highlight of another Olympic sport, etc.) may appear while the ice hockey game is on. The media guidance application may retain those segments within the ice hockey game in order to retain continuity of the game. However, if a segment (e.g., an Olympic news break) is between two different ice hockey games, the media guidance application may delete that segment or mark it for deletion because the segment is not needed to maintain continuity of the ice hockey game.

In some aspects, the media guidance application may perform the following actions for recording portions of a media asset based on a user's criteria. Specifically, the media guidance application may receive input from the user including a user selection of the media asset and a criterion for retaining portions of the media asset. For example, the media guidance application may provide an option to the user to record the media asset. When the user selects that option, the media guidance application may generate for display an option to input a criterion for recording portions of the media asset. It should be noted that the media guidance application may provide an option for the user to input more than one criterion. For example, the media guidance application may generate for display a text area that enables the user to enter one or more terms. The media guidance application may then use those terms as a criterion or criteria.

The media guidance application may determine whether the terms entered by the user should be used as one criterion or whether each term should be a criterion. For example, if the media guidance application receives "ice hockey, Canada" as input, the media guidance application may determine that both terms constitute one criterion and the user desires to retain only portions of the media assets that include ice hockey games where Team Canada is a participant. However, if the media guidance application receives "ice hockey, downhill skiing" then the media guidance application may determine that the user desires to retain portions of the media asset that include ice hockey games and downhill skiing events.

In addition or instead of generating for display a text area for user input, the media guidance application may generate one or more keywords associated with the media asset for a user to select. The media guidance application may receive a user selection of one or more keywords and enable the user to choose whether the keywords are to be used as one criterion or whether the keywords should constitute different criteria.

When the media guidance application starts recording the media asset, the media guidance application may generate keywords for different segments of the media asset by executing a content recognition algorithm. Specifically, the media guidance application may generate a first set of keywords for a first segment of the media asset, a second set of keywords for a second segment of the media asset, and a third set of keywords for a third segment of the media asset by executing a content recognition algorithm on the first segment, the second segment, and the third segment. In this instance, the first segment within the media asset precedes the second segment and the second segment precedes the third segment. To continue with the example above, the media guidance application may record a first segment of the Winter Olympic games and execute a content recognition algorithm against that segment.

Specifically, the media guidance application may use video content recognition to determine specific objects in each frame of the segment and then add to a list of keywords terms associated with each object. For example, if the media guidance application determines through video content recognition that a skier is within a frame of the segment, the term "skiing" may be added to the set of keywords. Additionally or alternatively, if the media guidance application determines that a specific skier is in the frame, the skier's name may be added to the set of keywords. The same process may be repeated using audio content recognition so that any audio keywords are added to the set of keywords.

The media guidance application may generate a set of keywords for the criterion or criteria entered by the user. Specifically, the media guidance application may generate a fourth set of keywords based on the criterion. This is the set of keywords that may later be compared with sets of keywords generated for each segment. The media guidance application may generate the fourth set of words by, for example, retrieving, from a database, objects related to the terms input by the user.

For example, if the media guidance application receives user input that includes the terms "ice hockey" and "USA," the media guidance application may search the database for objects related to those two terms. For example, the term "ice hockey" may be related to objects such as a "puck," "hockey stick", "goalie," "minor penalty," etc. Each of those objects may have keywords associated with the object. Specifically, the object "hockey stick" may have associated keywords such as "right-handed," "left-handed," etc. The object "goalie" may have associated keywords such as "goalie mask," "pads," "net minder," etc. The media guidance application may add all or some of those keywords to the fourth set of keywords.

The media guidance application may compare keywords associated with different segments with keywords associated with the criterion input by the user. Specifically, the media guidance application may compare the first set of keywords, the second set of keywords, and the third set of keywords with the fourth set of keywords. For example, the media guidance application may compare each set of keywords and determine that for a first set ten out of twenty-one keywords match. The media guidance application may perform the same or similar comparison for the second and third sets of keywords.

The media guidance application may determine, based on the comparing, that the first segment and the third segment match the criterion, and that the second segment does not match the criterion. For example, a threshold value may be provided to the media guidance application to determine whether a match has occurred. The threshold value may be a percentage of the keywords matching or an absolute number. In the example above, if ten out of 21 words have matched and the threshold value is 50%, then the media guidance application may determine that no match has occurred based on ten out of 21 being less than 50%.

If the media guidance application determines that a specific segment does not match the criterion/criteria, the media guidance application may mark that segment for deletion. Specifically, the media guidance application may, based on determining that the second segment does not match the criterion, store a delete indicator for the second segment that indicates that the second segment is to be deleted. For example, the media guidance application may store the delete indicator with metadata associated with the specific segment. Alternatively or additionally, the media guidance application may maintain a segment map that indicates, for each segment, whether the segment is to be retained or marked for deletion. The media guidance application may mark for deletion the second segment by adding a delete indicator to the location in the segment map corresponding to the second segment.

When the media guidance application determines that the first set of keywords and the third set of keywords match the criterion/criteria and the second set of keywords, located between the first and third segments, does not, the media guidance may compare the first and third segments to determine whether those segments are associated with the same portion of the media asset. Specifically, the media guidance application may compare the first set of keywords to the third set of keywords. The comparison may be performed in the same or similar manner as the comparison between the first, second, and third sets of keywords and the set of keywords associated with the criterion, as described above.

The media guidance application may determine whether the two segments match the same portion of the media asset. Specifically, the media guidance application may determine, based on the comparing of the first set of keywords and the third set of keywords, whether the third segment matches the first segment. The media guidance application may perform this step in the same or similar manner as determining that the first and the third segments match the criterion and the second does not, as described above.

If the media guidance application determines that the first and third segments correspond to the same portion of the media asset, the media guidance application may remove the delete indicator associated with the second segment. For example, the media guidance application may update the segment map to change the delete indicator associated with the second segment to an indicator indicating that the second segment is to be retained. Additionally or alternatively, the media guidance application may remove the delete indicator from the metadata associated with the second segment.

For example, the media guidance application may receive user input to record a broadcast of the Winter Olympics that lasts 12 hours. Within that broadcast, sports such as ice hockey, skiing, snowboarding, etc., may be shown. The media guidance application may receive from the user input to record the broadcast and specify that "ice hockey" is to be recorded. The media guidance application may start recording the media asset and mark all segments for deletion until a first instance of "ice hockey" is detected. Specifically, the media guidance application may determine that an ice hockey game between Team USA and Team Canada has started or is about to start. If, for example, there is a break in showing the game that includes a segment with some kind of Olympic update, the media guidance application may retain that segment to keep continuity of the game. However, if the USA-Canada ice hockey game ends, a new game begins (e.g., Finland vs. Sweden), and there is a segment included between those games, the media guidance application may mark the segment for deletion based on continuity not being needed between games, but rather just within the game.

In some embodiments, the media guidance application, based on determining that the third segment does not match the first segment, may add a new event indicator to the third segment. To continue with the example above, if the media guidance application determines that the first segment is associated with one ice hockey game and the third segment with a different ice hockey game, then the media guidance application may add a new event indicator to the metadata of the third segment. Additionally or alternatively, the media guidance application may add a new event indicator to the segment map, described above.

In some embodiments, it may be desirable to start a new event (e.g., a different ice hockey game) without having to view the beginning of the segment that includes another sport. Thus, the media guidance application may update the new event indicator with a location within the third segment where a first match between the third set of keywords and the fourth set of keywords occurred and delete a portion of the third segment prior to the location. It should be noted that the media guidance application may mark the portion of the third segment for deletion to be deleted at a later time. For example, a second ice hockey game may start in the middle of a segment, where the first half of the segment includes skiing. If the criterion does not match skiing, the media guidance application may delete or mark for deletion the first half of the segment.

In some embodiments, the media guidance application may process the media asset and delete segments that have been marked for deletion and create cues in the media asset in those places that have associated new events. Specifically, the media guidance application may determine a first plurality of segments of the media asset that have an associated delete indicator and a second plurality of segments of the media asset that have an associated event indicator. The media guidance application may, based on the determining, update the media asset, wherein the updating comprises deleting the first plurality of segments and inserting a cue to indicate every new event within the media asset. For example, when the media asset has been recorded and all the segments marked either for deletion or retention (including new event markers), the media guidance application may concatenate the segments to be kept and delete the segments marked for deletion. The media guidance application may also insert cues into the media asset (e.g., visual indicators and/or audio indicators) to signal new events (e.g., a second ice hockey game).

In some embodiments, the media guidance application may provide to the user options for use as part of the criterion. Specifically, when the media guidance application receives the input of the media asset to record, the media guidance application may receive a selection of a media listing associated with the media asset. The media guidance application may retrieve, from a database that stores associations between entities, a plurality of entities that are related to the media asset and generate for display one or more indications corresponding to one or more entities of the plurality of entities that are most closely related to the media asset. The media guidance application may receive the user selection of one or more entities to use in the criterion.

For example, the media guidance application may have access to a database that includes a set of entities that have been determined to be associated with the media asset. Those entities may be people, places, actors, characters, sports, videos, songs, etc. The media guidance application may generate for display indications for those entities to be selected by the user. Specifically, if the media asset is an Olympic broadcast, the media guidance application may generate for display athletes' names participating in the Olympic events, places where the events are taking place, names of sports that will be broadcast, etc.

In some embodiments, the first segment, the second segment, and the third segment are contiguous. For example, the media guidance application may split a portion (e.g., the first 15 minutes of an Olympic broadcast) of the media asset into three segments (five minutes each segment). Those segments are contiguous. In some embodiments, each segment may be a video frame or a specific number of video frames and associated audio.

In some embodiments, when generating the fourth set of keywords based on the criterion, the media guidance application may perform the following actions. The media guidance application may convert the criterion into textual data and parse the textual data into a plurality of terms. The media guidance application may retrieve, from a database that includes associations between terms and keywords, keywords associated with each term of the plurality of terms and add, to the fourth set of keywords, the keywords associated with each term of the plurality of terms.

For example, if the criterion is provided in the form of a user selecting items on the screen, the media guidance application may convert those selections into textual data and split the data into terms. Specifically, if the criterion includes a user selection of "ice hockey" and "Canada," the media guidance application may retrieve from the database associated terms (e.g., stick, puck, Team Canada, etc.) The media guidance application may then add those keywords to the fourth set of keywords.

In some embodiments, the media guidance application, when determining, based on the comparing, that the first segment and the third segment match the criterion and that the second segment does not match the criterion, may perform the following. The media guidance application may determine that a number of keywords in the first set of keywords that matches keywords in the fourth set of keywords meets a threshold value and determine that a number of keywords in the second set of keywords that matches keywords in the fourth set of keywords does not meet the threshold value. The media guidance application may make these determinations, for example, based on a percentage of keywords matched or a specific number of keywords that matched.

DESCRIPTION

Systems and methods are provided herein to record portions of media assets. Specifically, a media guidance application may be configured to receive user input of a media asset to record, together with a criterion for recording portions of that media asset. The criterion in this case corresponds to content within the media asset that the user desires to consume. However, it would be useful to retain portions of the media asset that do not match the criterion, but are between two portions that do match the criterion. This would happen when the two portions are part of the same presentation.

For example, a user may like tennis and want to record a broadcast of the "U.S. Open," which may last for twelve hours. However, the user may only want to watch matches with specific athletes (e.g., U.S. Players). Thus, the media guidance application may receive as input a selection of the U.S. Open broadcast and a criterion "U.S. Players."

When the media guidance starts recording the broadcast, the media guidance application may split the media asset into segments (e.g., five minutes each). The media guidance application may execute a content recognition algorithm against each segment to determine whether the segment matches "U.S. Players" (i.e., one of the players participating in the tennis match is a U.S. Player). As the match progresses, each segment is stored as a continuous presentation. However, the tennis match may get interrupted by, for example, a news break. The segment prior to the newsbreak would be labeled as the first segment and the newsbreak as the second segment.

The news break would not match a "U.S. Player." Therefore, the news break would be marked for deletion. However, the news break should be retained in order to keep continuity of the presentation (i.e., the tennis match in progress). Thus, when the next segment (the third segment) is determined to match the criterion, the system may determine whether this next segment is part of the same tennis match (i.e., matches the same U.S. tennis player). If so, this current segment is not marked for deletion and the prior segment is unmarked for deletion in order to maintain continuity of the tennis match.

Figure 1:
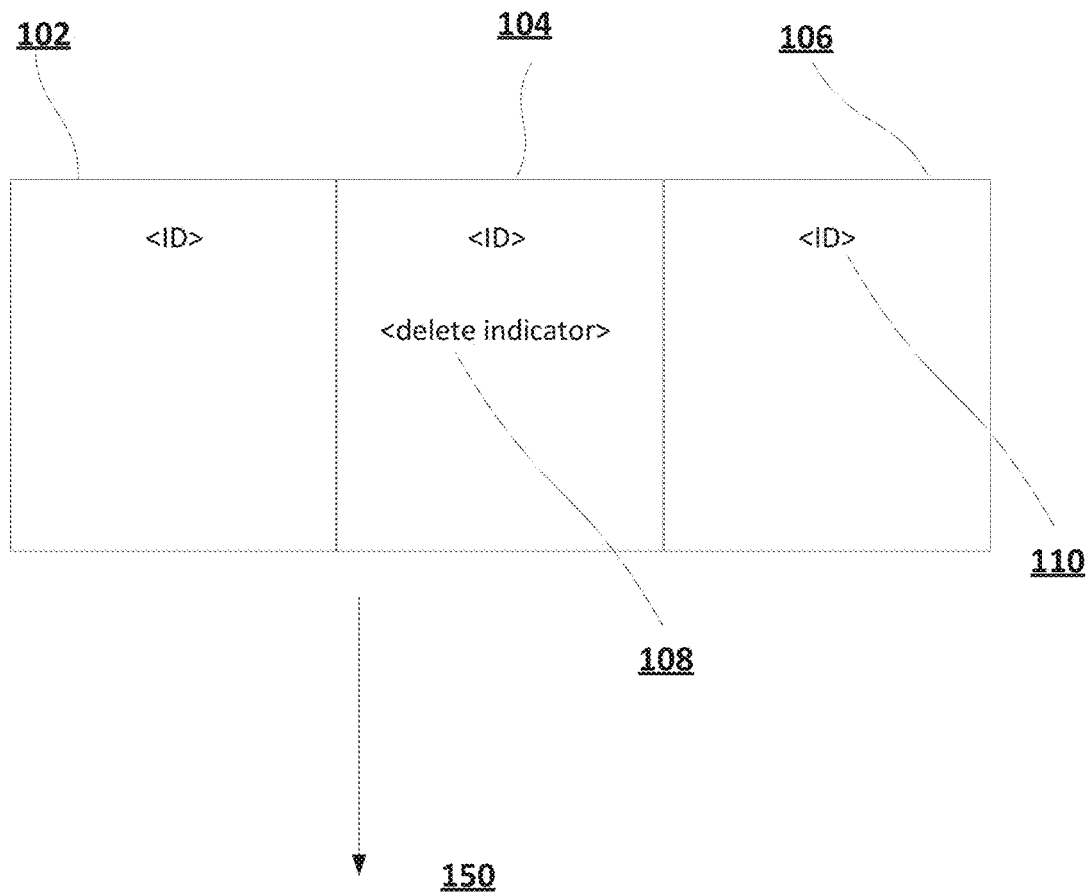
FIG. 1 shows an illustrative embodiment of a data structure that may be used to store data associated with specific segments and an updated state of that data structure, in accordance with some embodiments of the disclosure.
Figure 1:
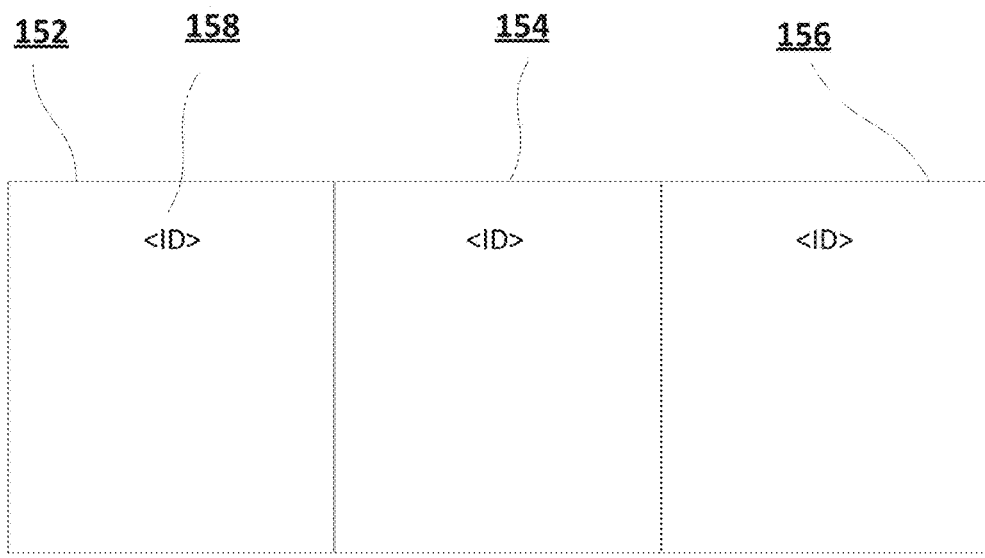

FIG. 1 illustrates how metadata associated with each of a first segment, a second segment, and a third segment may change. The first, second, and third segments may corresponds to the first, second and third segments described above (i.e., the first segment is of a tennis match that features a U.S. player, the second segment is the news break, and the third segment represents the continuation of the match Metadata excerpt 100 illustrates metadata structures 102, 104 and 106 associated with a first segment, the second segment, and the third segment, respectively. The metadata structure associated with each segment may include a segment identifier 110 that uniquely identifies the segment within the media asset. Structure 104 that is associated with the second segment may include the tag for the delete indicator. This would be the delete indicator added to the metadata as a result of the media guidance application determining that the news break does not match the criterion of "U.S. Player."

Metadata excerpt 150 illustrates metadata structures 152, 154, and 156 corresponding to the first segment, the second segment and the third segment, respectively. Excerpt 150 represents metadata structure after process 600 has been executed and the media guidance application has determined that the second segment is to be retained because it is between two segments of the same presentation (e.g., the same tennis match). Each structure includes identifier 158 that uniquely identifies each segment within the media asset. It should be noted that the delete indicator has been removed as a result of executing process 900 of FIG. 9). It should also be noted that segment metadata may include such information as the start time of the segment within the media asset, the end time of the segment within the media asset, keywords associated with the media asset, or a pointer to a file containing the keywords.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 2:
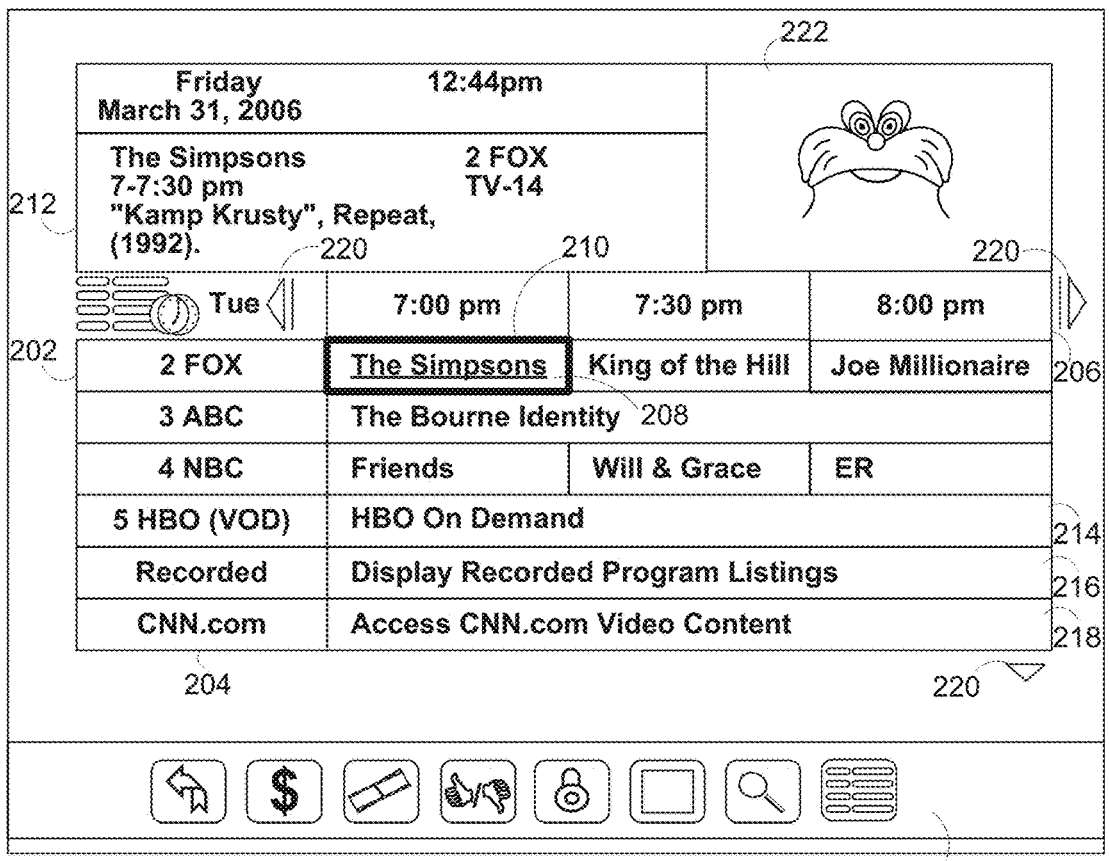
FIG. 2 shows an illustrative embodiment of a display screen that may be used to provide media guidance application listings and other media guidance information, in accordance with some embodiments of the disclosure.
Figure 3:
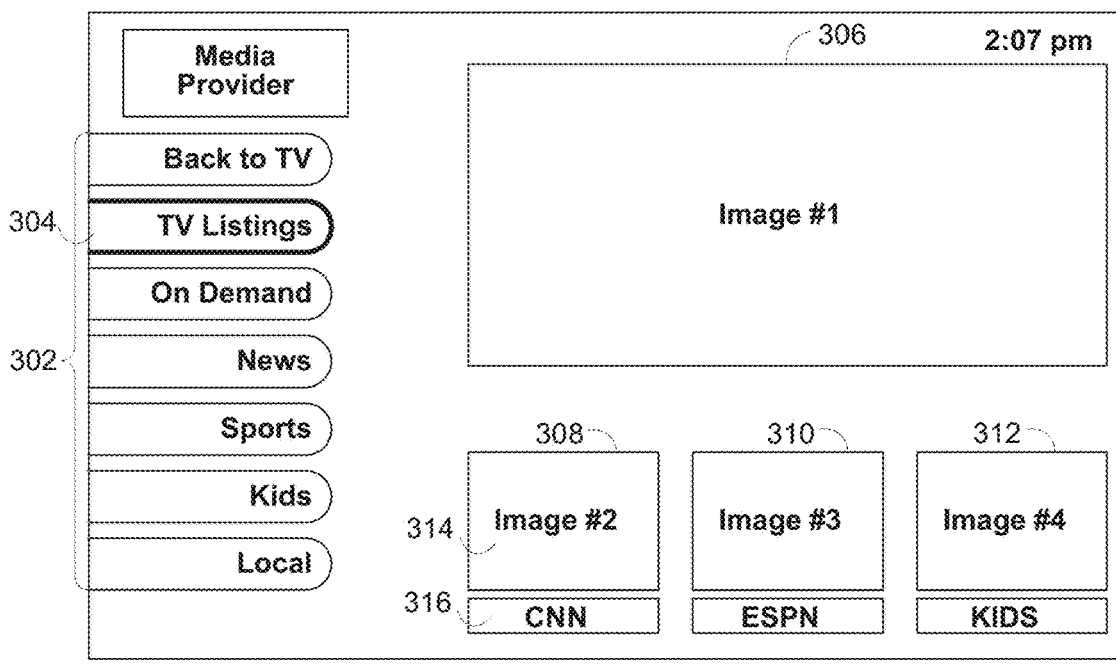
FIG. 3 shows another illustrative embodiment of a display screen that may be used to provide media guidance application listings, in accordance with some embodiments of the disclosure.

FIGS. 2-3 show illustrative display screens that may be used to provide media guidance data. The display screens shown in FIGS. 2-3 may be implemented on any suitable user equipment device or platform. While the displays of FIGS. 2-3 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 2 shows illustrative grid of a program listings display 200 arranged by time and channel that also enables access to different types of content in a single display. Display 200 may include grid 202 with: (1) a column of channel/content type identifiers 204, where each channel/content type identifier (which is a cell in the column) identifies a different channel or content type available; and (2) a row of time identifiers 206, where each time identifier (which is a cell in the row) identifies a time block of programming. Grid 202 also includes cells of program listings, such as program listing 208, where each listing provides the title of the program provided on the listing's associated channel and time. With a user input device, a user can select program listings by moving highlight region 210. Information relating to the program listing selected by highlight region 210 may be provided in program information region 212. Region 212 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 202 may provide media guidance data for non-linear programming including on-demand listing 214, recorded content listing 216, and Internet content listing 218. A display combining media guidance data for content from different types of content sources is sometimes referred to as a "mixed-media" display. Various permutations of the types of media guidance data that may be displayed that are different than display 200 may be based on user selection or guidance application definition (e.g., a display of only recorded and broadcast listings, only on-demand and broadcast listings, etc.). As illustrated, listings 214, 216, and 218 are shown as spanning the entire time block displayed in grid 202 to indicate that selection of these listings may provide access to a display dedicated to on-demand listings, recorded listings, or Internet listings, respectively. In some embodiments, listings for these content types may be included directly in grid 202. Additional media guidance data may be displayed in response to the user selecting one of the navigational icons 220. (Pressing an arrow key on a user input device may affect the display in a similar manner as selecting navigational icons 220.)

Display 200 may also include video region 222, and options region 226. Video region 222 may allow the user to view and/or preview programs that are currently available, will be available, or were available to the user. The content of video region 222 may correspond to, or be independent from, one of the listings displayed in grid 202. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 226 may allow the user to access different types of content, media guidance application displays, and/or media guidance application features. Options region 226 may be part of display 200 (and other display screens described herein), or may be invoked by a user by selecting an on-screen option or pressing a dedicated or assignable button on a user input device. The selectable options within options region 226 may concern features related to program listings in grid 202 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 5. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 3. Video mosaic display 300 includes selectable options 302 for content information organized based on content type, genre, and/or other organization criteria. In display 300, television listings option 304 is selected, thus providing listings 306, 308, 310, and 312 as broadcast program listings. In display 300 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 308 may include more than one portion, including media portion 314 and text portion 316. Media portion 314 and/or text portion 316 may be selectable to view content in full-screen or to view information related to the content displayed in media portion 314 (e.g., to view listings for the channel that the video is displayed on).

The listings in display 300 are of different sizes (i.e., listing 306 is larger than listings 308, 310, and 312), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 4:
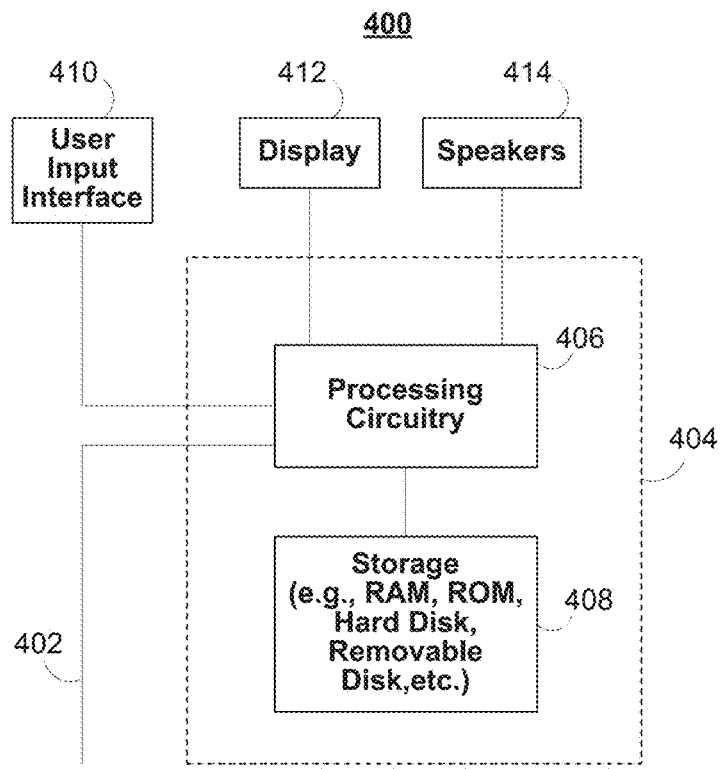
FIG. 4 is a block diagram of an illustrative device in accordance with some embodiments of the disclosure.

Users may access content and the media guidance application (and its display screens described above and below) from one or more of their user equipment devices. FIG. 4 shows a generalized embodiment of illustrative user equipment device 400. More specific implementations of user equipment devices are discussed below in connection with FIG. 5. User equipment device 400 may receive content and data via input/output (hereinafter "I/O") path 402. I/O path 402 may provide content (e.g., broadcast programming, on-demand programming, Internet content, content available over a local area network (LAN) or wide area network (WAN), and/or other content) and data to control circuitry 404, which includes processing circuitry 406 and storage 408. Control circuitry 404 may be used to send and receive commands, requests, and other suitable data using I/O path 402. I/O path 402 may connect control circuitry 404 (and specifically processing circuitry 406) to one or more communications paths (described below). I/O functions may be provided by one or more of these communications paths, but are shown as a single path in FIG. 4 to avoid overcomplicating the drawing.

Control circuitry 404 may be based on any suitable processing circuitry such as processing circuitry 406. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 404 executes instructions for a media guidance application stored in memory (i.e., storage 408). Specifically, control circuitry 404 may be instructed by the media guidance application to perform the functions discussed above and below. For example, the media guidance application may provide instructions to control circuitry 404 to generate the media guidance displays. In some implementations, any action performed by control circuitry 404 may be based on instructions received from the media guidance application.

In client-server based embodiments, control circuitry 404 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 5). In addition, communications circuitry may include circuitry that enables peer-to-peer communication of user equipment devices, or communication of user equipment devices in locations remote from each other (described in more detail below).

Memory may be an electronic storage device provided as storage 408 that is part of control circuitry 404. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 408 may be used to store various types of content described herein as well as media guidance data described above. Nonvolatile memory may also be used (e.g., to launch a boot-up routine and other instructions). Cloud-based storage, described in relation to FIG. 5, may be used to supplement storage 408 or instead of storage 408.

Control circuitry 404 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 404 may also include scaler circuitry for upconverting and downconverting content into the preferred output format of the user equipment 400. Circuitry 404 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 408 is provided as a separate device from user equipment 400, the tuning and encoding circuitry (including multiple tuners) may be associated with storage 408.

A user may send instructions to control circuitry 404 using user input interface 410. User input interface 410 may be any suitable user interface, such as a remote control, mouse, trackball, keypad, keyboard, touch screen, touchpad, stylus input, joystick, voice recognition interface, or other user input interfaces. Display 412 may be provided as a stand-alone device or integrated with other elements of user equipment device 400. For example, display 412 may be a touchscreen or touch-sensitive display. In such circumstances, user input interface 410 may be integrated with or combined with display 412. Display 412 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 412 may be HDTV-capable. In some embodiments, display 412 may be a 3D display, and the interactive media guidance application and any suitable content may be displayed in 3D. A video card or graphics card may generate the output to the display 412. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 404. The video card may be integrated with the control circuitry 404. Speakers 414 may be provided as integrated with other elements of user equipment device 400 or may be stand-alone units. The audio component of videos and other content displayed on display 412 may be played through speakers 414. In some embodiments, the audio may be distributed to a receiver (not shown), which processes and outputs the audio via speakers 414.

The guidance application may be implemented using any suitable architecture. For example, it may be a stand-alone application wholly-implemented on user equipment device 400. In such an approach, instructions of the application are stored locally (e.g., in storage 408), and data for use by the application is downloaded on a periodic basis (e.g., from an out-of-band feed, from an Internet resource, or using another suitable approach). Control circuitry 404 may retrieve instructions of the application from storage 408 and process the instructions to generate any of the displays discussed herein. Based on the processed instructions, control circuitry 404 may determine what action to perform when input is received from input interface 410. For example, movement of a cursor on a display up/down may be indicated by the processed instructions when input interface 410 indicates that an up/down button was selected.

In some embodiments, the media guidance application is a client-server based application. Data for use by a thick or thin client implemented on user equipment device 400 is retrieved on-demand by issuing requests to a server remote to the user equipment device 400. In one example of a client-server based guidance application, control circuitry 404 runs a web browser that interprets web pages provided by a remote server. For example, the remote server may store the instructions for the application in a storage device. The remote server may process the stored instructions using circuitry (e.g., control circuitry 404) and generate the displays discussed above and below. The client device may receive the displays generated by the remote server and may display the content of the displays locally on equipment device 400. This way, the processing of the instructions is performed remotely by the server while the resulting displays are provided locally on equipment device 400. Equipment device 400 may receive inputs from the user via input interface 410 and transmit those inputs to the remote server for processing and generating the corresponding displays. For example, equipment device 400 may transmit a communication to the remote server indicating that an up/down button was selected via input interface 410. The remote server may process instructions in accordance with that input and generate a display of the application corresponding to the input (e.g., a display that moves a cursor up/down). The generated display is then transmitted to equipment device 400 for presentation to the user.

In some embodiments, the media guidance application is downloaded and interpreted or otherwise run by an interpreter or virtual machine (run by control circuitry 404). In some embodiments, the guidance application may be encoded in the ETV Binary Interchange Format (EBIF), received by control circuitry 404 as part of a suitable feed, and interpreted by a user agent running on control circuitry 404. For example, the guidance application may be an EBIF application. In some embodiments, the guidance application may be defined by a series of JAVA-based files that are received and run by a local virtual machine or other suitable middleware executed by control circuitry 404. In some of such embodiments (e.g., those employing MPEG-2 or other digital media encoding schemes), the guidance application may be, for example, encoded and transmitted in an MPEG-2 object carousel with the MPEG audio and video packets of a program.

Figure 5:
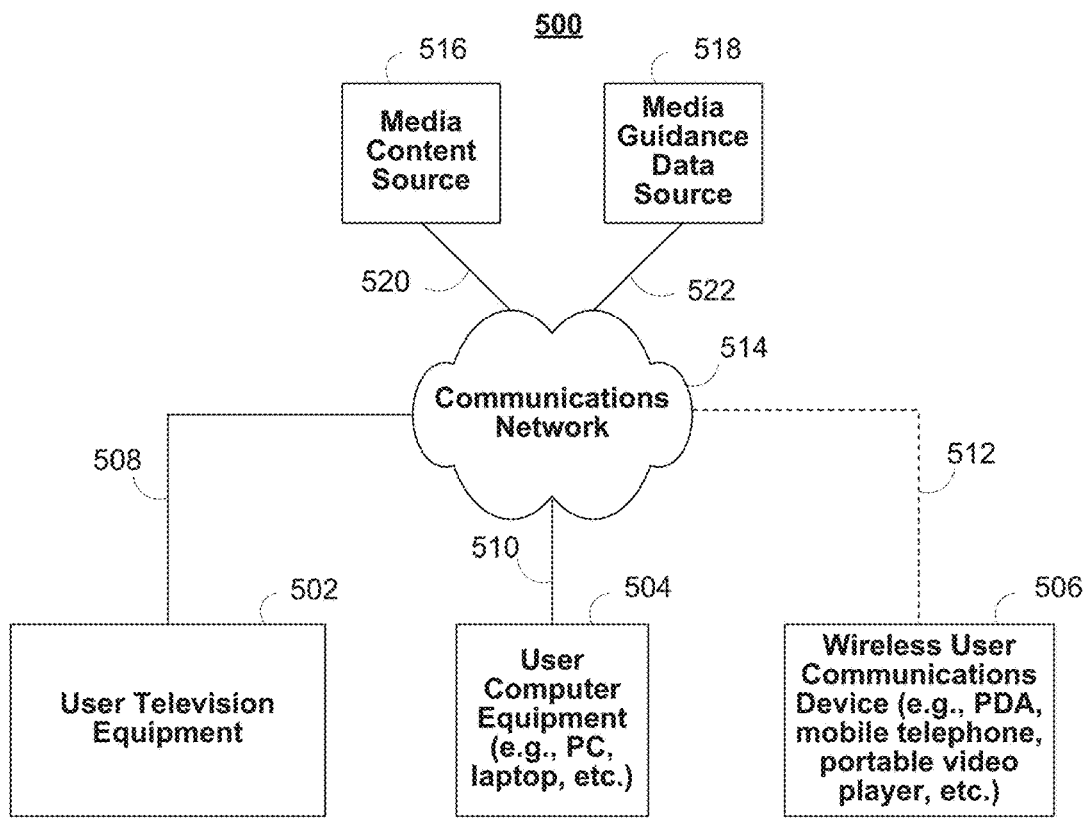
FIG. 5 is a block diagram of an illustrative media system, in accordance with some embodiments of the disclosure.

User equipment device 400 of FIG. 4 can be implemented in system 500 of FIG. 5 as user television equipment 502, user computer equipment 504, wireless user communications device 506, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 4 may not be classified solely as user television equipment 502, user computer equipment 504, or a wireless user communications device 506. For example, user television equipment 502 may, like some user computer equipment 504, be Internet-enabled allowing for access to Internet content, while user computer equipment 504 may, like some television equipment 502, include a tuner allowing for access to television programming. The media guidance application may have the same layout on various different types of user equipment or may be tailored to the display capabilities of the user equipment. For example, on user computer equipment 504, the guidance application may be provided as a web site accessed by a web browser. In another example, the guidance application may be scaled down for wireless user communications devices 506.

In system 500, there is typically more than one of each type of user equipment device but only one of each is shown in FIG. 5 to avoid overcomplicating the drawing. In addition, each user may utilize more than one type of user equipment device and also more than one of each type of user equipment device.

In some embodiments, a user equipment device (e.g., user television equipment 502, user computer equipment 504, wireless user communications device 506) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 514. Namely, user television equipment 502, user computer equipment 504, and wireless user communications device 506 are coupled to communications network 514 via communications paths 508, 510, and 512, respectively. Communications network 514 may be one or more networks including the Internet, a mobile phone network, mobile voice or data network (e.g., a 4G or LTE network), cable network, public switched telephone network, or other types of communications network or combinations of communications networks. Paths 508, 510, and 512 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 512 is drawn with dotted lines to indicate that in the exemplary embodiment shown in FIG. 5 it is a wireless path and paths 508 and 510 are drawn as solid lines to indicate they are wired paths (although these paths may be wireless paths, if desired). Communications with the user equipment devices may be provided by one or more of these communications paths, but are shown as a single path in FIG. 5 to avoid overcomplicating the drawing.

Although communications paths are not drawn between user equipment devices, these devices may communicate directly with each other via communication paths, such as those described above in connection with paths 508, 510, and 512, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 514.

System 500 includes content source 516 and media guidance data source 518 coupled to communications network 514 via communication paths 520 and 522, respectively. Paths 520 and 522 may include any of the communication paths described above in connection with paths 508, 510, and 512. Communications with the content source 516 and media guidance data source 518 may be exchanged over one or more communications paths, but are shown as a single path in FIG. 5 to avoid overcomplicating the drawing. In addition, there may be more than one of each of content source 516 and media guidance data source 518, but only one of each is shown in FIG. 5 to avoid overcomplicating the drawing. (The different types of each of these sources are discussed below.) If desired, content source 516 and media guidance data source 518 may be integrated as one source device. Although communications between sources 516 and 518 with user equipment devices 502, 504, and 506 are shown as through communications network 514, in some embodiments, sources 516 and 518 may communicate directly with user equipment devices 502, 504, and 506 via communication paths (not shown) such as those described above in connection with paths 508, 510, and 512.

Content source 516 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 516 may be the originator of content (e.g., a television broadcaster, a Webcast provider, etc.) or may not be the originator of content (e.g., an on-demand content provider, an Internet provider of content of broadcast programs for downloading, etc.). Content source 516 may include cable sources, satellite providers, on-demand providers, Internet providers, over-the-top content providers, or other providers of content. Content source 516 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 518 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 518 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 518 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 518 may provide user equipment devices 502, 504, and 506 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 408, and executed by control circuitry 404 of a user equipment device 400. In some embodiments, media guidance applications may be client-server applications where only a client application resides on the user equipment device, and server application resides on a remote server. For example, media guidance applications may be implemented partially as a client application on control circuitry 404 of user equipment device 400 and partially on a remote server as a server application (e.g., media guidance data source 518) running on control circuitry of the remote server. When executed by control circuitry of the remote server (such as media guidance data source 518), the media guidance application may instruct the control circuitry to generate the guidance application displays and transmit the generated displays to the user equipment devices. The server application may instruct the control circuitry of the media guidance data source 518 to transmit data for storage on the user equipment. The client application may instruct control circuitry of the receiving user equipment to generate the guidance application displays.

Content and/or media guidance data delivered to user equipment devices 502, 504, and 506 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 500 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 5.

In one approach, user equipment devices may communicate with each other within a home network. User equipment devices can communicate with each other directly via short-range point-to-point communication schemes described above, via indirect paths through a hub or other similar device provided on a home network, or via communications network 514. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 516 to access content. Specifically, within a home, users of user television equipment 502 and user computer equipment 504 may access the media guidance application to navigate among and locate desirable content. Users may also access the media guidance application outside of the home using wireless user communications devices 506 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 514. These cloud resources may include one or more content sources 416 and one or more media guidance data sources 518. In addition or in the alternative, the remote computing sites may include other user equipment devices, such as user television equipment 502, user computer equipment 504, and wireless user communications device 506. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 504 or wireless user communications device 506 having content capture feature. Alternatively, the user can first transfer the content to a user equipment device, such as user computer equipment 504. The user equipment device storing the content uploads the content to the cloud using a data transmission service on communications network 514. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 4.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 6:
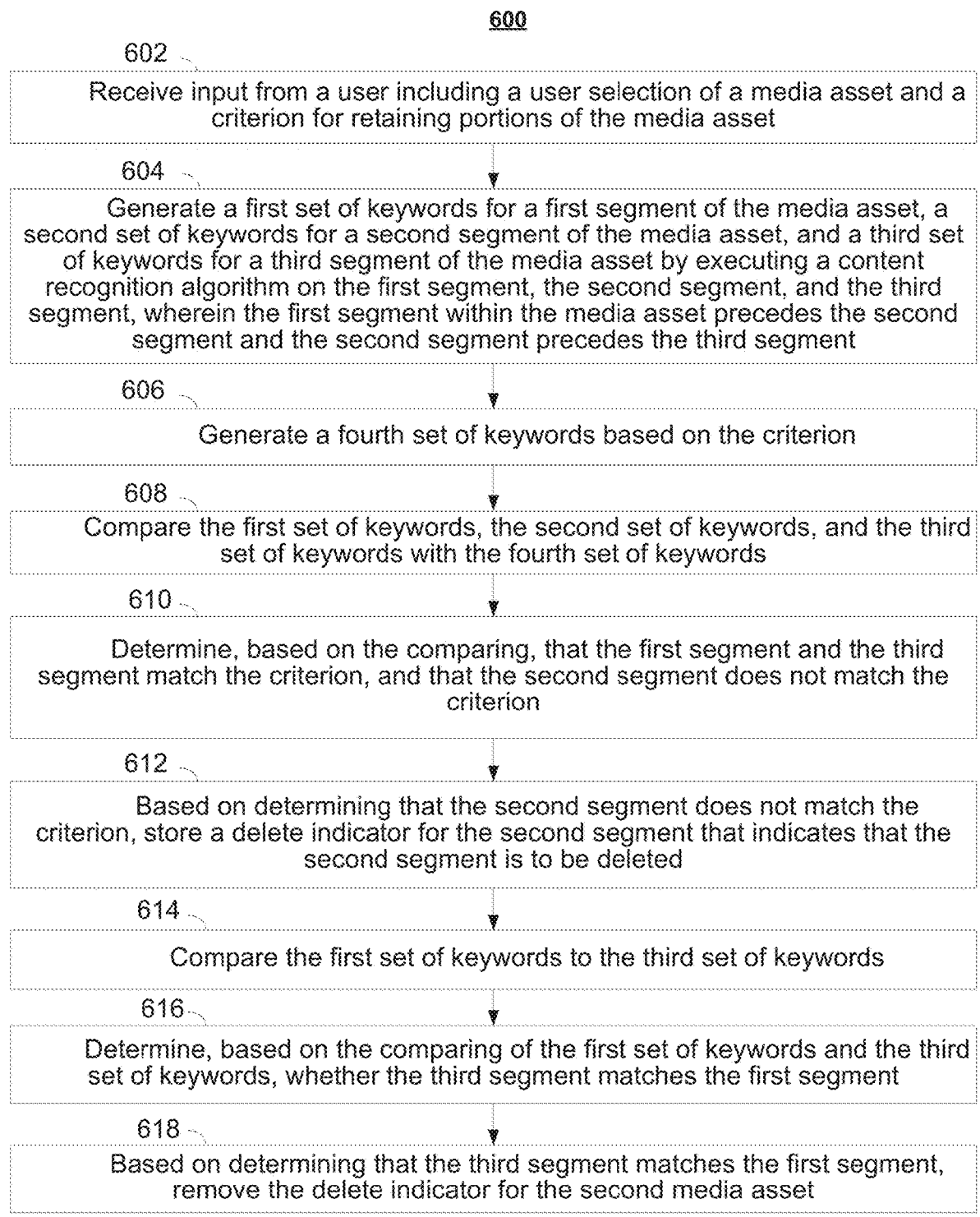
FIG. 6 depicts an illustrative process involved in recording portions of a media asset based on a user's criterion, in accordance with some embodiments of this disclosure.

A media guidance application may be configured to record portions of media assets based on a user's criteria. For example, the media guidance application may perform (e.g., via control circuitry 404) process 600 of FIG. 6 to record portions of media assets based on a user's criteria.

At step 602, the media guidance application receives (e.g., via control circuitry 404 from user input interface 410) input from the user including a user selection of a media asset and a criterion for retaining portions of the media asset. For example, the media guidance application may receive user input while display 200 (FIG. 2) or display 300 (FIG. 3) are displayed to the user. The media guidance application may receive a user selection of media listing 208 (FIG. 2) or media listing 308 (FIG. 3). The user selection may be received via a remote control or another user input device (e.g., keyboard, mouse, touch screen interface, etc.).

The media guidance application may receive the criterion as text input from the user. For example, the media guidance application may generate for display an input area where the user is able to enter text. User input may be received via a remote control, keyboard, touch screen interface, a voice interface (e.g., a microphone coupled with voice recognition algorithm), or any other suitable device.

In some embodiments, the media guidance application, when receiving input from the user that includes a user selection of the media asset and a criterion for retaining portions of the media asset may perform the following actions. The media guidance application may receive a selection of a media listing associated with the media asset. For example, the media guidance application may receive the selection of a media listing while display 200 (FIG. 2) or display 300 (FIG. 3) is displayed to the user. The user selection may be received through user input interface 410.

In some embodiments, the media guidance application may be able to take user input and the criterion in the form of a natural language query. For example, a user may provide a voice query "Record all Olympic ice hockey games." In response, the media guidance application may convert the query into input to record all Olympic broadcasts and use "ice hockey" or "ice hockey games" as the criterion.

The media guidance application may retrieve, from a database that stores associations between entities, a plurality of entities that are related to the media asset. The database may further include information describing relationships between the entities. Each entity may be stored as a node and the database may include a semantic network or knowledge graph of these nodes, where the semantic network maintains relationships between certain nodes. These relationships may be stored as percentage values of how related the entities are. Knowledge graphs and their features are described in greater detail in U.S. patent application Ser. No. 14/501,504, filed Sep. 30, 2014, U.S. patent application Ser. No. 14/500,309, filed Sep. 29, 2014, and U.S. patent application Ser. No. 14/448,308, filed Jul. 31, 2014, which are hereby incorporated by reference herein in their entireties. For example, the media guidance application may have access to a database that stores entities related to media assets. Specifically, a media asset such as an Olympic broadcast may have various entities related to it. If the Olympic broadcast is scheduled to include a number of sports (e.g., ice hockey, skiing, snowboarding, etc.), the database may include those sports as entities. Additionally or alternatively, specific athletes participating in the sports included in the Olympic broadcast may be included as entities in the database associated with the broadcast.

The database may be located at media content source 516 or at media guidance data source 518. Alternatively, the database may have portions at both media content source 516 and media guidance data source 518. The media guidance application may access the database through communications network 514 via I/O path 402 (FIG. 4). The media guidance application may store the received entities in storage 408.

The media guidance application may generate for display one or more indications corresponding to one or more entities of the plurality of entities that are most closely related to the media asset. For example, the media guidance may retrieve the received indications from storage 408. The retrieved entities may be stored in a data structure (e.g., an array). The media guidance application may determine how many entities have been received from the database. The media guidance application may retrieve (e.g., from storage 408) a threshold value for the number of indications associated with entities that are to be displayed. If the number of entities is greater than the threshold value, the media guidance application may select those entities that are most closely related with the media asset. For example, the media asset may have relationship strength value for each entity that it is related to. The media guidance application may compare those values in order to determine which entities should have associated indications generated for display. For example, if the threshold value is ten, then the media guidance application may generate for display indications of ten entities that have the highest relationship strength values (i.e., the ten most closely related entities).

Those entities may be people, places, actors, characters, sports, videos, songs, etc. For example, athletes participating in the sports being broadcast may be entities. In another example, the different sports may be located in different places (e.g., skiing in the mountains and ice skating at a rink). The media guidance application may provide an option to a user to record segments that include sporting events occurring in the mountains and/or at a skating rink. Videos may include videos of athletes describing their bios, etc. The media guidance application may receive a user selection of one or more of those entities to use in the criterion.

At step 604, the media guidance application generates (e.g., via control circuitry 404) a first set of keywords for a first segment of the media asset, a second set of keywords for a second segment of the media asset, and a third set of keywords for a third segment of the media asset by executing a content recognition algorithm on the first segment, the second segment, and the third segment, wherein the first segment within the media asset precedes the second segment and the second segment precedes the third segment. For example, the media guidance application may receive (e.g., from media content source 516 and/or media guidance data source 518) a portion of the media asset. The media guidance application may split the portion of the media asset into three segments (first, second, and third segments). The media guidance application may perform the splitting in various ways. For example, the media guidance application may split the segments according to time (e.g., five-minute intervals). The media guidance application may also split the segments into segments that fit the criterion and segments that do not. For example, the media guidance application may execute the content recognition algorithm against each video frame. As video frames keep matching the criterion, they are maintained as the same segment. As soon as the media guidance application reaches a video frame that does not fit the criterion, a new segment is started and all the frames that do not fit the criterion are stored as one segment until a frame is reached that matches the criterion again. It should be noted that once a segment is finalized, (i.e., frames that do not match the criterion end and frames that match the criterion begin), audio content recognition may be executed against the segment.

The media guidance application may execute a content recognition algorithm against each segment. The content recognition algorithm may include a visual content recognition process that is able to scan the video of the segment and recognize objects and places in the segment. For example, if a segment includes a portion of a soccer game, the media guidance application may execute a visual content recognition process that may recognize a soccer ball, the name of the stadium and the city where the game is being played, names of teams that are playing, the name of the competition, etc. Those objects may have associated keywords which the media guidance application may add to the set of keywords for the specific segment. Additionally or alternatively the media guidance application may execute an audio content recognition process that may recognize words associated with the segment. The words associated with the segment may be added to the set of keywords as well.

It should be noted that instead of executing a content recognition algorithm, the media guidance application may transmit video and audio information associated with the segment to another device where the content recognition algorithm may be executed and the resulting keywords may be sent back. In some embodiments, the content recognition algorithm may be executed at media guidance content source 516 and/or media guidance data source 518. In those embodiments, the media guidance application may transmit a request to execute the content recognition algorithm on a specific segment. The media guidance application may include as part of the request the start time of the segment, the end time of the segment and a media asset identifier associated with the media asset that the segment is in. The media guidance application may receive back a set of keywords for the segment. The media guidance application may store the set of keywords in a keyword file associated with the segment.

Figure 7:
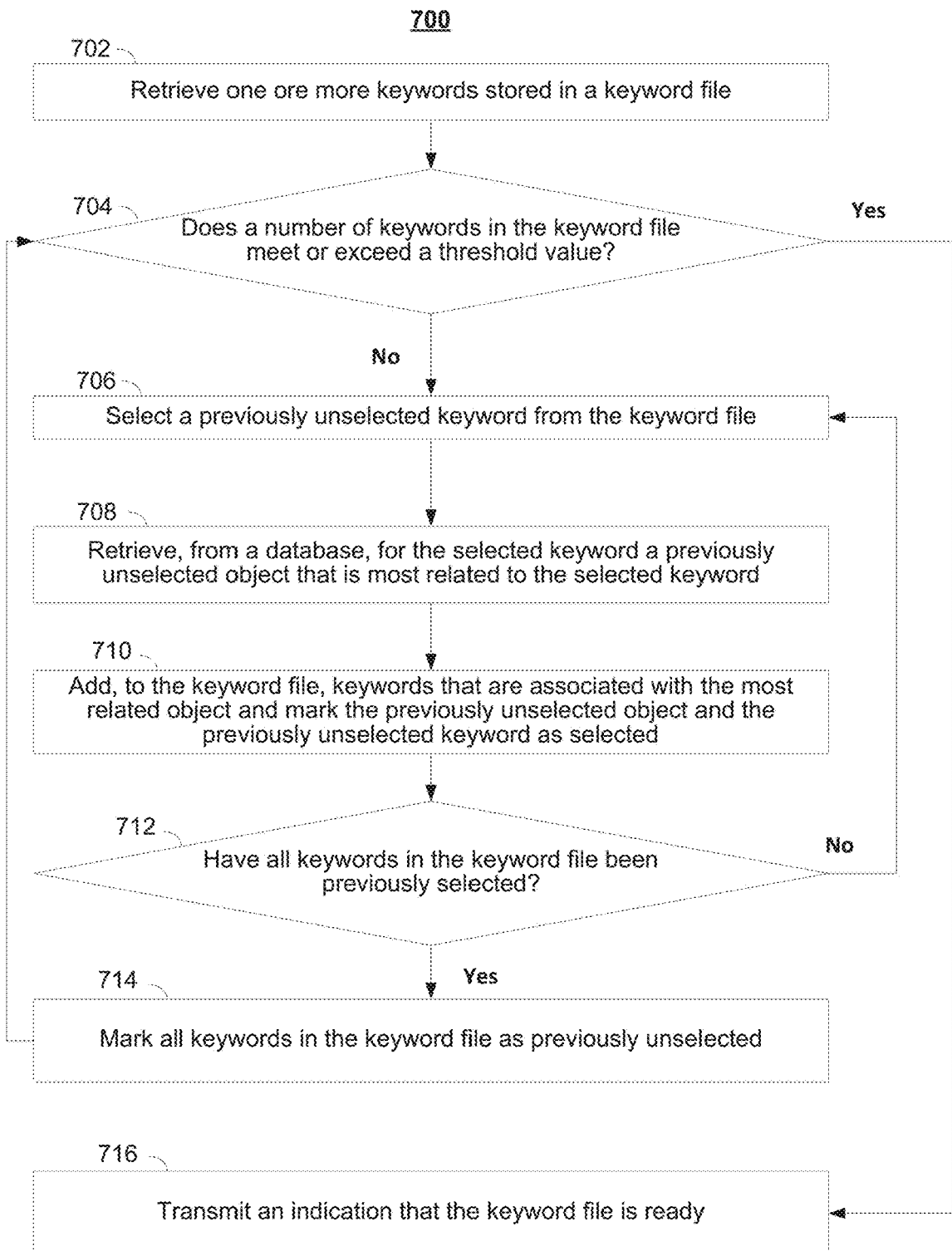
FIG. 7 depicts an illustrative process involved in generating a set of keywords, in accordance with some embodiments of this disclosure.

If more keywords are required, the current set of keywords may be expanded to include additional keywords that are related to those already in the keyword file. Process 700 of FIG. 7 illustrates one possible method of generating more keywords. At step 702, the media guidance application retrieves (e.g., via control circuitry 404) one or more keywords stored in a keyword file. The keyword file may be located in storage 408. Additionally or alternatively, the keyword file may be located at media content source 516 and/or media guidance data source 518. In those instances, the media guidance application may receive the keyword file via communications network 514.

At step 704, the media guidance application determines (e.g., via control circuitry 404) whether a number of keywords in the keyword file meet or exceed a threshold value. For example, a threshold value may be set by a service provider and may be updated from time to time. The threshold value may be stored in storage 408. The threshold value may be preconfigured by the manufacturer or content distributor or specified by the user. If the number of keywords in the keyword file meet or exceed the threshold value, the media guidance application, at step 716, transmits (e.g., via control circuitry through I/O port 402) an indication that the keyword file is ready for further processing (e.g., a comparison with another keyword file).

However, if the number of keywords in the keyword file does not meet or exceed the threshold value, process 700 moves to step 706. At step 706, the media guidance application selects (e.g., via control circuitry 404) a previously unselected keyword from the keyword file. For example, the media guidance application may copy the keyword from hard disk into memory.

At step 708, the media guidance application retrieves (e.g., via control circuitry 404), from a database, for the selected keyword a previously unselected object that is most related to the selected keyword. The database may be located at media content source 516 and/or media guidance data source 518, as described above. For example, the media guidance application may generate a query to the database to search for objects that are related to the selected keyword. Specifically, if the selected keyword is "Lindsey Vonn," the media guidance application may retrieve objects associated with "Lindsey Vonn" (e.g., sport, her Olympic events, etc.).

At step 710, the media guidance application adds (e.g., via control circuitry 404), to the keyword file, keywords that are associated with the most related object, and marks the previously unselected object and the previous unselected keyword as selected. For example, if Lindsey Vonn's most related object is the event that she competes in the most (e.g., downhill slalom), the media guidance application may add that keyword to the keyword file. The media guidance application may then mark "downhill slalom" as a previously selected object. Also the keyword "Lindsey Vonn" is marked selected at this time.

At step 712, the media guidance application determines whether all the keywords in the keyword file have been previously selected. If all the keywords have not previously been selected, process 700 moves to step 706, where steps 706-710 are repeated for each keyword in the keyword file. If all keywords have previously been selected, process 700 moves to step 714.

At step 714, the media guidance application marks (e.g., via control circuitry 304) all keywords in the keyword file as previously unselected. For example, the media guidance application may store the keywords in a data structure (e.g., an array) in memory. The media guidance application may iterate through each keyword and perform steps 708-710 on each keyword. The media guidance application may mark a keyword as selected by moving a pointer from one keyword to the next in a specific order. However, in step 714, the pointer is reset back to the beginning of the data structure so that the keywords may be selected again.

After step 714, process 700 moves to step 704, where the media guidance application determines again whether the number of keywords in the keyword file meets or exceeds the threshold value. As described above, process 700 continues until the threshold value is met or exceeded.

It should be noted that, in some embodiments, programming instructions for process 700 may be encoded onto a non-transitory storage medium (e.g., storage device 408) as a set of instructions to be decoded and executed by processing circuitry (e.g., processing circuitry 406). Processing circuitry may in turn provide instructions to other subcircuits contained within control circuitry 404, such as the tuning, video generating, encoding, decoding, encrypting, decrypting, scaling, analog/digital conversion circuitry, and the like.

It is contemplated that the descriptions of FIG. 7 may be used with any other embodiment of this disclosure. In addition, the descriptions described in relation to the process of FIG. 7 may be done in alternative orders or in parallel to further the purposes of this disclosure. For example, control circuitry 404 may submit multiple queries to the database in parallel, or it may submit multiple queries to a plurality of similar databases in order to reduce lag and speed the execution of the process. Furthermore, it should be noted that the process of FIG. 7 may be implemented on a combination of appropriately configured software and hardware, and that any of the devices or equipment discussed in relation to FIGS. 4-5 could be used to implement one or more portions of the process.

At step 606, the media guidance application generates (e.g., via control circuitry 404) a fourth set of keywords based on the criterion. In some embodiments, the media guidance application may generate the fourth set of keywords based on the criterion as follows. The media guidance application may convert the criterion into textual data and parse the textual data into a plurality of terms. For example, if the criterion is received as one or more user selections of specific terms generated for display, the media guidance application converts those selections into text data. Specifically, each selection may be an object that includes text data representing the object. The media guidance application may parse the text for each object into terms. For example, if textual data includes "ice hockey" and "Canada," the media guidance application may parse the data into two terms.

The media guidance application may retrieve, from a database that includes associations between terms and keywords, keywords associated with each term of the plurality of terms. For example, the media guidance application may query a database located at media content source 516 and/or media guidance data source 518. The database may also be stored in storage 408 on the same device where the media guidance application resides. In some embodiments, portions of the database may be split among some or all of these locations. The media guidance application may transmit a request to the database for keywords associated with the terms "ice hockey" and "Canada." The media guidance application may receive back keywords such as "puck," "hockey stick," "net minder," etc. The media guidance application may add to the fourth set of keywords the keywords associated with each term of the plurality of terms (e.g., the keywords above). The fourth set of keywords may be stored in a keyword file in storage 408.

Additionally or alternatively, the media guidance application may execute process 700 of FIG. 7 to add to the keywords located in the keyword file, as described above in relation to generating keywords for segments.

At this point, the media guidance application compares the keywords associated with each segment with keywords associated with the criterion in order to determine which of the first, second, and third segments match the criterion. At step 608, the media guidance application compares (e.g., via control circuitry 404) the first set of keywords, the second set of keywords, and the third set of keywords with the fourth set of keywords. For example, the media guidance application may iterate through each set of keywords to determine which keywords match. The media guidance application may store the results of the comparison in storage 408 or remotely at media content source 516 and/or media guidance data source 518. Specifically, the media guidance application may store the number of keywords that matched between the two sets, the total number of keywords in the set associated with the segment, and the total number of keywords in the set associated with the criterion. It should be noted that any combination of that information may be stored. Additionally or alternatively, the media guidance application may store a percentage of keywords that match. This may be the percentage of keywords that matched based on the matching keywords and the keywords associated with the segment and/or a percentage of keywords that matched based on the keywords that matched and the keywords associated with criterion.

At step 610, the media guidance application determines (e.g., via control circuitry 404) based on the comparing, that the first segment and the third segment match the criterion, and that the second segment does not match the criterion. The media guidance application may make the determination based on any of a number of words matching, a percentage of words matching based on the keywords that matched and the keywords associated with the segment and/or the keywords that matched and the keywords associated with the criterion.

In some embodiments, the media guidance application may determine that a number of keywords in the first set of keywords that matches keywords in the fourth set of keywords meets a threshold value and determine that a number of keywords in the second set of keywords that matches keywords in the fourth set of keywords does not meet the threshold value. In some embodiments, the threshold value may be a specific number of keywords that must match in order for the segment to match the criterion. That number may be as small as one. In other embodiments, the threshold value may be based a percentage of words matching based on the keywords that matched and the keywords associated with the segment and/or the keywords that matched and the keywords associated with the criterion.

For example, if the received criterion is "ice hockey" that has associated keywords such as "goalie," "puck"and" hockey stick," the media guidance application may try to match those keywords to the keywords associated with the segments. Thus, if the content recognition algorithm detects a puck in the first segment, the keyword "puck" is added to the set of keywords associated with the first segment. Thus, at least one keyword will match between the first segment and the criterion.

For example, if a keyword file associated with a segment has twenty keywords, the keyword file associated with the criterion has one hundred keywords, and ten keywords match, the media guidance application may be configured for different ways to determine whether a segment matches the criterion. For example, 50% of the words in the keyword file associated with the segment matched; thus a threshold value of 50% or lower produces a match. However, only 10% of the keyword file associated with the criterion match. Thus, a threshold value of 10% or lower calculated in this manner meets the criterion. Thus, two different types of threshold values are possible.

At step 612, the media guidance application, based on determining that the second segment does not match the criterion, stores (e.g., via control circuitry 404 in storage 408) a delete indicator for the second segment that indicates that the second segment is to be deleted. In continuing with the example above, if the set of keywords associated with the second segment does not match any keywords associated with the criterion or matches too few keywords (i.e., a threshold value is not reached), the media guidance application may determine that the second segment does not match the criterion. The media guidance application may proceed to mark the second segment for deletion. For example, the media guidance application may store the delete indicator with metadata associated with the segment or in a segment map. As referred to herein, the term "segment map" refers to a data structure that includes a variable for each segment of a media asset in order to indicate whether each segment is to be retained or deleted.

Figure 8:
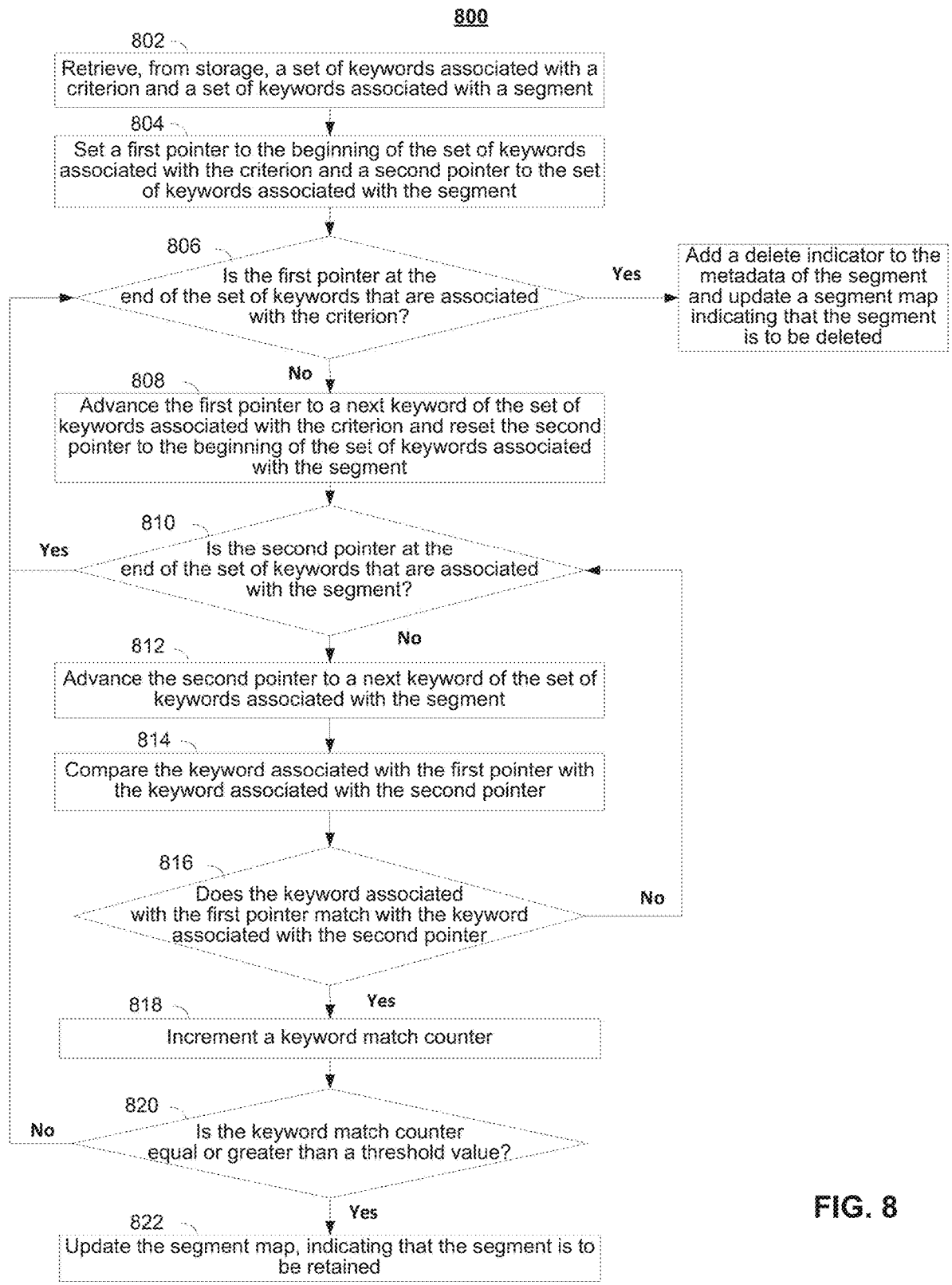
FIG. 8 depicts an illustrative process involved in determining whether a segment matches a criterion entered by a user, in accordance with some embodiments of this disclosure.

Steps 608 to 612 may be illustrated by process 800 of FIG. 8. Specifically, process 800 illustrates how the media guidance application determines whether to mark a segment for deletion or to retain a segment. At step 802, the media guidance application retrieves (e.g., via control circuitry 404 from storage 408) a set of keywords associated with a criterion and a set of keywords associated with a segment. For example, the media guidance application may retrieve the sets of keywords from respective keyword files and copy the sets of keywords into memory as data structures (e.g., arrays). To continue with the example above, in this step the media guidance application may retrieve keywords "puck," "goalie," "hockey stick," etc., that are associated with the criterion. Keywords associated with each segment are also retrieved.

At step 804, the media guidance application sets (e.g., via control circuitry 404) a first pointer to the beginning of the set of keywords associated with the criterion and a second pointer to the set of keywords associated with the segment. For example, the media guidance application may set the first pointer to the beginning of the data structure corresponding to a segment and the second pointer to the data structure corresponding to the criterion. In this step the media guidance application sets a pointer to iterate through the keywords associated with the criterion.

At step 806, the media guidance application determines (e.g., via control circuitry 404) whether the first pointer is at the end of the set of keywords that are associated with the criterion. If the first pointer is at the end of the set of keywords and this step is reached, then process 800 has already iterated through all the keywords and a threshold value has not been reached in order to find a match between the segment and the criterion. Thus, the media guidance application adds (e.g., via control circuitry 404) a delete indicator to the metadata of the segment and updates a segment map indicating that the segment is to be deleted. If the first pointer is not at the end of the set of keywords, process 800 moves to step 808. This step is part of the iteration process that insures that all keywords are properly selected for comparison and no words are missed.

At step 808, the media guidance application advances (e.g., via control circuitry 404) the first pointer at a next keyword of the set of keywords associated with the criterion and rests the second pointer to the beginning of the set of keywords associated with the segment. For example, the media guidance application may advance the first pointer at the next variable within the data structure associated with the criterion and set the second pointer to the beginning of the data structure associated with the segment. This step is part of the iteration process described above.

At step 810, the media guidance application determines (e.g., via control circuitry 404) whether the second pointer is at the end of the set of keywords that are associated with the segment. If the media guidance application determines that the second pointer is at the end of the set of keywords that are associated with the segment, then a specific word in the set of keywords associated with the criterion did not match any keywords associated with the segment. This step is part of the iteration process. In this step, the second pointer is reset so that the next keyword associated with the criterion can be compared against all the keywords associated with the segment. Therefore, process 800 moves to step 806, described above in order to process the next keyword in the set associated with the criterion. If the media guidance application determines that the second pointer is not at the end of the set of keywords that are associated with the segment, process 800 moves to step 812.

At step 812, the media guidance application advances (e.g., via control circuitry 404) the second pointer to a next keyword of the set of keywords associated with the segment. At step 814, the media guidance application compares (e.g., via control circuitry 404) the keyword associated with the first pointer with the keywords associated with the second pointer. This may be a simple character-by-character comparison. In some embodiments, if a certain portion of the word matches a match may be found. For example, a match may be found between "athlete" and "athletes" despite the words not being fully the same.

At step 816, the media guidance application determines (e.g., via control circuitry 404) whether the keyword associated with the first pointer matches the keyword associated with the second pointer. If a match is not found, process 800 moves to step 812, where steps 810 to 816 are repeated. If a match is found process 800 moves to step 818. Steps 812 to 816 illustrate how a specific keyword associated with the criterion is compared with every keyword associated with a segment.

At step 818, the media guidance application increments (e.g., via control circuitry 404) a keyword match counter. The media guidance application may maintain a keyword match counter for process 800 in order keep track of the number of keywords that have matched between the two sets of keywords being compared. The keyword match counter may be stored in storage 408 or remotely at media content source 516 and/or media guidance data source 518.

At step 820, the media guidance application determines (e.g., via control circuitry 404) whether the keyword match counter is equal to or is greater than a threshold value. It should be noted that the threshold value and the keyword match counter may be a specific number or percentage as described above. If the keyword match counter is not equal to or greater than the threshold value, process 800 moves to step 806, where steps 806 to 818 are repeated. If the keyword match counter is equal to or greater than the threshold value, process 800 moves to step 822.

At step 822 the media guidance application updates (e.g., via control circuitry 404) the segment map, indicating that the segment is to be retained. Steps 818 to 822 use a keyword match counter to determine whether enough keywords match between the segment and the criterion for the segment to be retained.

It should be noted that, in some embodiments, programming instructions for process 800 may be encoded onto a non-transitory storage medium (e.g., storage device 408) as a set of instructions to be decoded and executed by processing circuitry (e.g., processing circuitry 406). Processing circuitry may in turn provide instructions to other sub-circuits contained within control circuitry 404, such as the tuning, video generating, encoding, decoding, encrypting, decrypting, scaling, analog/digital conversion circuitry, and the like.

It is contemplated that the descriptions of FIG. 8 may be used with any other embodiment of this disclosure. In addition, the descriptions described in relation to the process of FIG. 8 may be done in alternative orders or in parallel to further the purposes of this disclosure. Furthermore, it should be noted that the process of FIG. 8 may be implemented on a combination of appropriately configured software and hardware, and that any of the devices or equipment discussed in relation to FIGS. 4-5 could be used to implement one or more portions of the process.

When the media guidance application finishes executing (e.g., via process 800) step 612, the media guidance application moves to step 614. At step 614, the media guidance application compares (e.g., via control circuitry 404) the first set of keywords to the third set of keywords. The media guidance application may perform this step in the same manner as step 608, where keyword sets are compared. At this step, the media guidance application determines whether the first and the third segment correspond to the same presentation. For example, the media guidance application may determine whether the first segment is associated with one ice hockey game and the third segment with another ice hockey game.

At step 616, the media guidance application, based on the comparing of the first set of keywords and the third set of keywords, determines (e.g., via control circuitry 404) whether the third segment matches the first segment. The media guidance application may make this determines in the same manner as described in relation to step 610. Specifically, a percentage of matching keywords may be used as well as absolute matching values that are compared to a threshold value of the same type.

Figure 9:
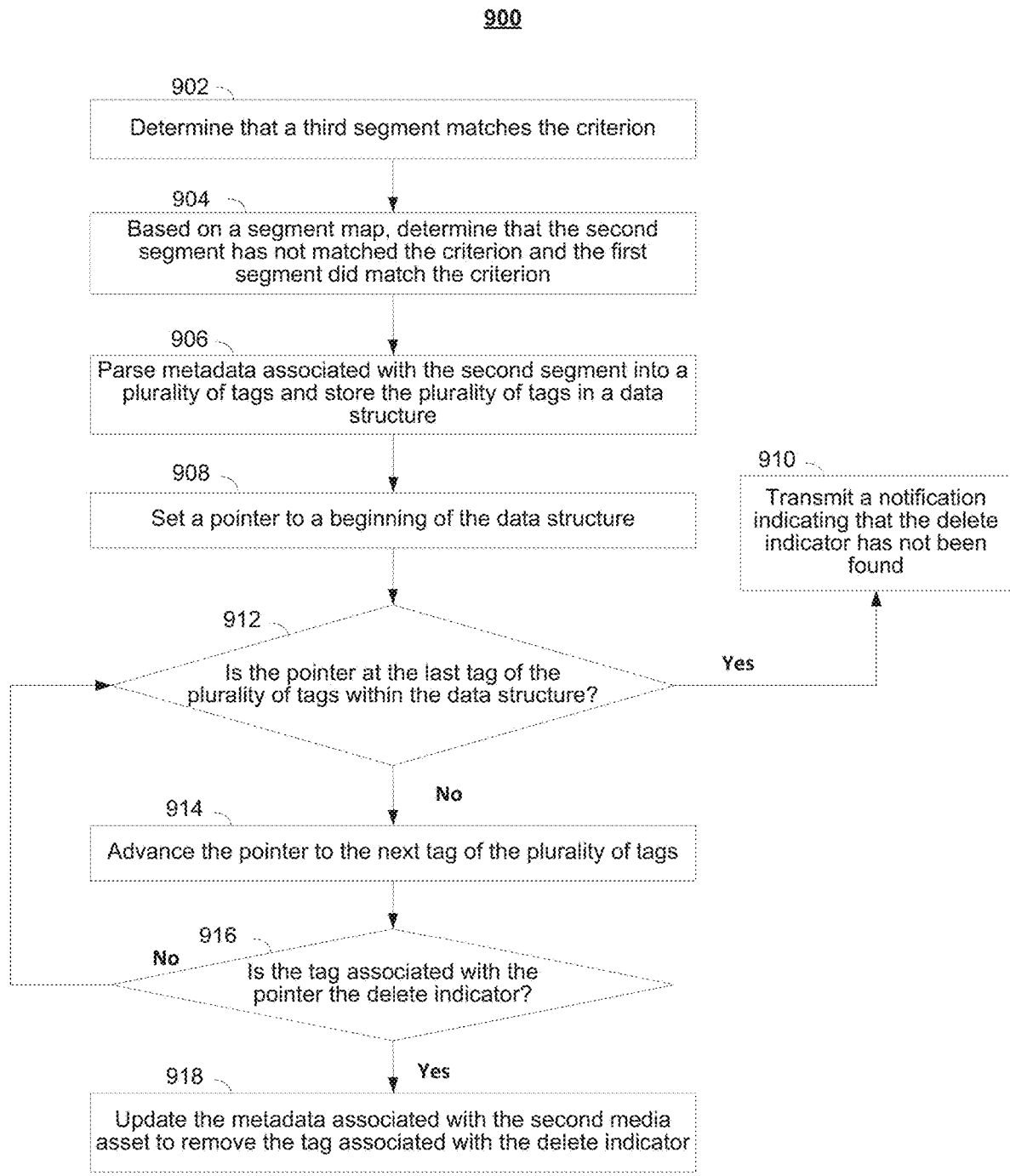
FIG. 9 depicts an illustrative process involved in removing a delete indicator from metadata associated with a segment, in accordance with some embodiments of this disclosure.

At step 618, the media guidance application, based on determining that the third segment matches the first segment, removes (e.g., via control circuitry 404) the delete indicator for the second media asset. For example, process 900 of FIG. 9 illustrates one possible way of removing the delete indicator.

At step 902 the media guidance application determines (e.g., via control circuitry 404) that a third segment matches the criterion. The media guidance application may make the determination as described in relation to step 610.

At step 904, the media guidance application, based on a segment map, determines (e.g., via control circuitry 404) that the second segment has not matched the criterion and the first segment did match the criterion. The media guidance application may access the segment map stored in storage 408, media content source 516, or media guidance data source 518. As described above, the segment map may be a data structure (e.g., an array) that includes a variable for every segment. The data structure may include an identifier corresponding to each segment and an indicator that indicates whether the segment is to be retained or not. The indicator may be a Boolean variable where the value of "True" indicates that the segment is to be retained and the value of "False" indicates that the segment is to be deleted.

At step 906, the media guidance application parses (e.g., via control circuitry 404) metadata associated with the second segment into a plurality of tags and stores the plurality of tags in a data structure. For example, the metadata associated with each segment may be stored in an XML file. One XML file may be used for all segments. Alternatively, one XML file may be used for each segment. The media guidance application may read the tags of the XML file and store the tags in a data structure (e.g., an array).

At step 908, the media guidance application sets (e.g., via control circuitry 404) a pointer to a beginning of the data structure. The pointer may simply be set to an address in memory representing the beginning of the data structure. At step 912, the media guidance application determines (e.g., via control circuitry 404) whether the pointer is at the last tag of the plurality of tags within the data structure. It should be noted that if process 900 reaches this point without finding a tag associated with the delete indicator, then the delete indicator is not present in the XML file associated with this particular segment. Thus, process 900 moves to step 910 where the media guidance application transmits (e.g., via control circuitry 404) a notification indicating that the delete indicator has not been found. However, if the pointer is not at the last tag of the plurality of tags within the data structure process 900 moves to step 914.

At step 914, the media guidance application advances (e.g., via control circuitry 404) a pointer to the next tag of the plurality of tags. For example, the media guidance application may set the pointer to the address in memory associated with the next tag. At step 916, the media guidance application determines (e.g., via control circuitry 404) whether the tag associated with the pointer is the delete indicator. The media guidance application may make the determination by comparing the text of the tag to a known delete indicator. For example, <delete indicator> may be the tag used in the XML file. At step 918, the media guidance application updates (e.g., via control circuitry 404) the metadata associated with the second media asset to remove the tag associated with the delete indicator. For example, the media guidance application may remove <delete indicator> text from the metadata associated with a segment and save the metadata to storage (e.g., storage 408).

It should be noted that, in some embodiments, programming instructions for process 900 may be encoded onto a non-transitory storage medium (e.g., storage device 408) as a set of instructions to be decoded and executed by processing circuitry (e.g., processing circuitry 406). Processing circuitry may, in turn, provide instructions to other sub-circuits contained within control circuitry 404, such as the tuning, video generating, encoding, decoding, encrypting, decrypting, scaling, analog/digital conversion circuitry, and the like.

It is contemplated that the descriptions of FIG. 9 may be used with any other embodiment of this disclosure. In addition, the descriptions described in relation to the process of FIG. 9 may be done in alternative orders or in parallel to further the purposes of this disclosure. Furthermore, it should be noted that the process of FIG. 9 may be implemented on a combination of appropriately configured software and hardware, and that any of the devices or equipment discussed in relation to FIGS. 4-5 could be used to implement one or more portions of the process.

In some embodiments, the media guidance application may based on determining that the third segment does not match the first segment, add a new event indicator to the third segment. For example, the media guidance application may add the new event indicator to the metadata corresponding to the third segment. Alternatively or additionally, the media guidance application may add the start time of the new event within the segment to the metadata of the segment. This information may be stored in storage 408 or remotely at media content source 516 and/or media guidance data source 518.

In some embodiments, the media guidance application may update the new event indicator with a location within the third segment where a first match between the third set of keywords and the fourth set of keywords occurred and delete a portion of the third segment prior to the location. This feature may be desirable in the instances where the new event starts towards the end of the segment and a user may need to view or review a large chunk of the segment in order to get to the content that the user desires to consume. Similarly, in some embodiments, the media guidance application may delete an end portion of a prior segment after the prior event has ended. It should be noted that these portions may be deleted or marked for deletion for later removal.

In some embodiments, the media guidance application may automatically delete all the segments marked for deletion. Additionally or alternatively, the media guidance application may prompt a user to make the decision. For example, when a user selects a media listing to consume the recorded media asset, the media guidance application may prompt the user to delete the segments marked for deletion. In some embodiments, the media guidance application may provide an option to the user to hide the segments that are marked for deletion by, for example, skipping them during playback.

In some embodiments, the media guidance application may determine a first plurality of segments of the media asset that have an associated delete indicator and a second plurality of segments of the media asset that have an associated event indicator. The media guidance application may make the determination by analyzing the metadata associated with each segment. Additionally or alternatively, the media guidance application may analyze the segment map. Thus, the segment map may be configured to store, in addition to the delete indicators, new event indicators. The media guidance application may, based on the determining, update the media asset by deleting the first plurality of segments and insert a cue to indicate every new event within the media asset. For example, in addition to deleting all the segments that have associated delete indicators, the media guidance application may insert one or more frames to indicate to the user that a new event has started or is about to start.

In some embodiments, as described above, the first, the second, and the third segments may be contiguous. In some embodiments, each of the first, second and third segment include a video frame. In some embodiments, each segment is a video frame.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method comprising:
    receiving, at a media guidance application, instructions to record a content based on a number of keywords;
    identifying, by the media guidance application, a first segment of the content, a second segment of the content, and a third segment of the content, wherein the first segment, the second segment and the third segment are continuous;
    determining, by the media guidance application, whether the first segment and the third segment include the number of the keywords and that the second segment does not include the number of the keywords, wherein the determination is made by the media guidance application automatically executing content recognition on the first segment, second segment, and the third segment; and in response to determining that the first segment and the third segment include the number of the keywords, causing, by the media guidance application, to be recorded the first segment, the second segment, and the third segment.

2. The method of claim 1, further comprising, based on determining that the third segment does not include the number of the keywords to the first segment, adding a new event indicator to the third segment.

3. The method of claim 2, further comprising: updating the new event indicator with a location within the third segment where a first match between the first segment and the third segment occurred; and deleting a portion of the third segment prior to the location.

4. The method of claim 2, further comprising:
determining a first plurality of segments of the content that have an associated delete indicator and a second plurality of segments of the content that have an associated event indicator; and
based on the determining, updating the content, wherein the updating comprises deleting the first plurality of segments and inserting a cue to indicate every new event within the content.

5. The method of claim 1, wherein determining to record the content without portions of the content that do not meet the number of the keywords further comprises:
receiving a selection of a media listing associated with the content;
retrieving, from a database that stores associations between entities, a plurality of entities that are related to the content;
generating for display one or more indications corresponding to one or more entities of the plurality of entities that are most closely related to the content; and
receiving a user selection of one or more entities to use in the number of the keywords.

6. The method of claim 5, wherein the plurality of entities comprises people, places, actors, characters, sports, videos, and songs.

7. The method of claim 1, wherein determining that the first segment and the third segment meet the criterion and that the second segment does not meet the criterion comprises:
determining that a number of keywords in the first segment that match keywords in the third segment meets a threshold value; and
determining that a number of keywords in the second segment that match keywords in the first segment does not meet the threshold value.

8. The method of claim 1, wherein each of the first, second, and third segment comprise a video frame.

9. A system for causing to be recorded content, the system comprising:
storage; and
control circuitry configured to:
receive instructions to record the content based on a number of keywords;
identify a first segment of the content, a second segment of the content, and a third segment of the content, wherein the first segment, the second segment and the third segment are continuous;
determine whether the first segment and the second third segment include the number of keywords meet the criterion and that the second segment does not include the number of keywords, wherein the determination is made by the media guidance application automatically executing content recognition on the first segment, second segment, and the third segment; and
in response to determining that the first segment and the second third segment include the number of keywords, cause to be recorded the first segment, the second segment, and the third segment.

10. The system of claim 9, wherein the control circuitry is further configured to, based on determining that the third segment does not include the number of the keywords to the first segment, add a new event indicator to the third segment.

11. The system of claim 10, wherein the control circuitry is further configured to:
update the new event indicator with a location within the third segment where a first match between the first segment and the third segment occurred; and
delete a portion of the third segment prior to the location.

12. The system of claim 10, wherein the control circuitry is further configured to:
determine a first plurality of segments of the content that have an associated delete indicator and a second plurality of segments of the content that have an associated event indicator; and
based on the determining, update the content, wherein the updating comprises deleting the first plurality of segments and inserting a cue to indicate every new event within the content.

13. The system of claim 9, wherein the control circuitry is further configured, when determining to record the content without portions of the content that do not meet the number of the keywords to:
receive a selection of a media listing associated with the content;
retrieve, from a database that stores associations between entities, a plurality of entities that are related to the content;
generate for display one or more indications corresponding to one or more entities of the plurality of entities that are most closely related to the content; and
receive the user selection of one or more entities to use in the number of the keywords.

14. The system of claim 13, wherein the plurality of entities comprises people, places, actors, characters, sports, videos, and songs.

15. The system of claim 9, wherein the control circuitry is further configured, when determining that the first segment and the third segment meet the criterion and that the second segment does not meet the criterion to:
determine that a number of keywords in the first segment that matches keywords in the second segment meets a threshold value; and
determine that a number of keywords in the second segment that matches keywords in the first segment does not meet the threshold value.

16. The system of claim 10, wherein each of the first, second, and third segment comprise a video frame.

* * * * *